(12) United States Patent
Rollinson

(10) Patent No.: US 11,566,888 B1
(45) Date of Patent: Jan. 31, 2023

(54) SYSTEMS AND METHODS FOR AUTOMATIC MEASUREMENT AND SCANNING OF COMPLEX SURFACES

(71) Applicant: HEBI Robotics, Pittsburgh, PA (US)

(72) Inventor: David Rollinson, Pittsburgh, PA (US)

(73) Assignee: HEBI Robotics, Pittsburgh, PA (US)

( * ) Notice: Subject to any disclaimer, the term of this patent is extended or adjusted under 35 U.S.C. 154(b) by 203 days.

(21) Appl. No.: 17/023,452

(22) Filed: Sep. 17, 2020

Related U.S. Application Data

(60) Provisional application No. 63/034,456, filed on Jun. 4, 2020, provisional application No. 62/901,927, filed on Sep. 18, 2019.

(51) Int. Cl.
| | | |
|---|---|---|
| *G01B 17/02* | (2006.01) | |
| *B25J 18/00* | (2006.01) | |
| *G06T 11/00* | (2006.01) | |
| *G06T 19/00* | (2011.01) | |
| *G06T 17/00* | (2006.01) | |

(52) U.S. Cl.
CPC .............. *G01B 17/02* (2013.01); *B25J 18/00* (2013.01); *G06T 11/001* (2013.01); *G06T 17/00* (2013.01); *G06T 19/006* (2013.01)

(58) Field of Classification Search
CPC ........ G01B 17/02; B25J 18/00; G06T 11/001; G06T 17/00; G06T 19/006
See application file for complete search history.

(56) References Cited

U.S. PATENT DOCUMENTS

| | | | |
|---|---|---|---|
| 2008/0215510 A1* | 9/2008 | Regli | ...................... G06T 19/00 706/12 |
| 2016/0328883 A1* | 11/2016 | Parfenov | ................. G06T 17/00 |
| 2020/0184153 A1* | 6/2020 | Bongartz | ................. G06N 5/04 |

\* cited by examiner

*Primary Examiner* — Chong Wu
(74) *Attorney, Agent, or Firm* — Jones Day

(57) ABSTRACT

Systems and methods are provided for collecting measurement data for a three-dimensional object. In embodiments, a computer model of the three-dimensional object is generated that correlates points on the three-dimensional object with points in three-dimensional space; the computer model is used to collect measurement data of the three-dimensional object and associate the collected measurement data with points in three-dimensional space; and a plan view computer model of the three-dimensional object is generated that depicts the measurement data in two dimensions and that associates the depicted measurement data with points in three-dimensional space.

20 Claims, 18 Drawing Sheets

US 11,566,888 B1

SYSTEMS AND METHODS FOR AUTOMATIC MEASUREMENT AND SCANNING OF COMPLEX SURFACES

CROSS-REFERENCE TO RELATED APPLICATION

This application claims priority to U.S. Provisional Patent Application No. 62/901,927, filed on Sep. 18, 2019, and titled "Method for Automated Measurement and Scanning of Complex Surfaces for NDT Inspection," and to U.S. Provisional Patent Application No. 63/034,456, filed on Jun. 4, 2020, and titled "Augmented-Reality Tools Assisting Industrial Inspections," both of which are incorporated herein by reference in their entirety.

TECHNICAL FIELD

The technology described herein relates generally to the field of non-destructive testing.

BACKGROUND

In industrial installations, such as refineries, it is often desirable to evaluate the condition of equipment such as pipes and tanks. Various technologies exist to perform non-destructive testing (NDT) inspections, particularly of the wall thickness of pipes and tanks. Often NDT measurements are performed as single point measurements, for example made and recorded manually by a trained inspector. In some cases, NDT measurements are performed as scan measurements using a probe that is moved along the inspected surface. In such cases, measured probe positions are typically correlated with probe measurements across the area of some surface.

SUMMARY

Systems and methods are provided for collecting measurement data for a three-dimensional object. In embodiments, a computer model of the three-dimensional object is generated that correlates points on the three-dimensional object with points in three-dimensional space; the computer model is used to collect measurement data of the three-dimensional object and associate the collected measurement data with points in three-dimensional space; and a plan view computer model of the three-dimensional object is generated that depicts the measurement data in two dimensions and that associates the depicted measurement data with points in three-dimensional space.

DETAILED DESCRIPTION

Figure 1:
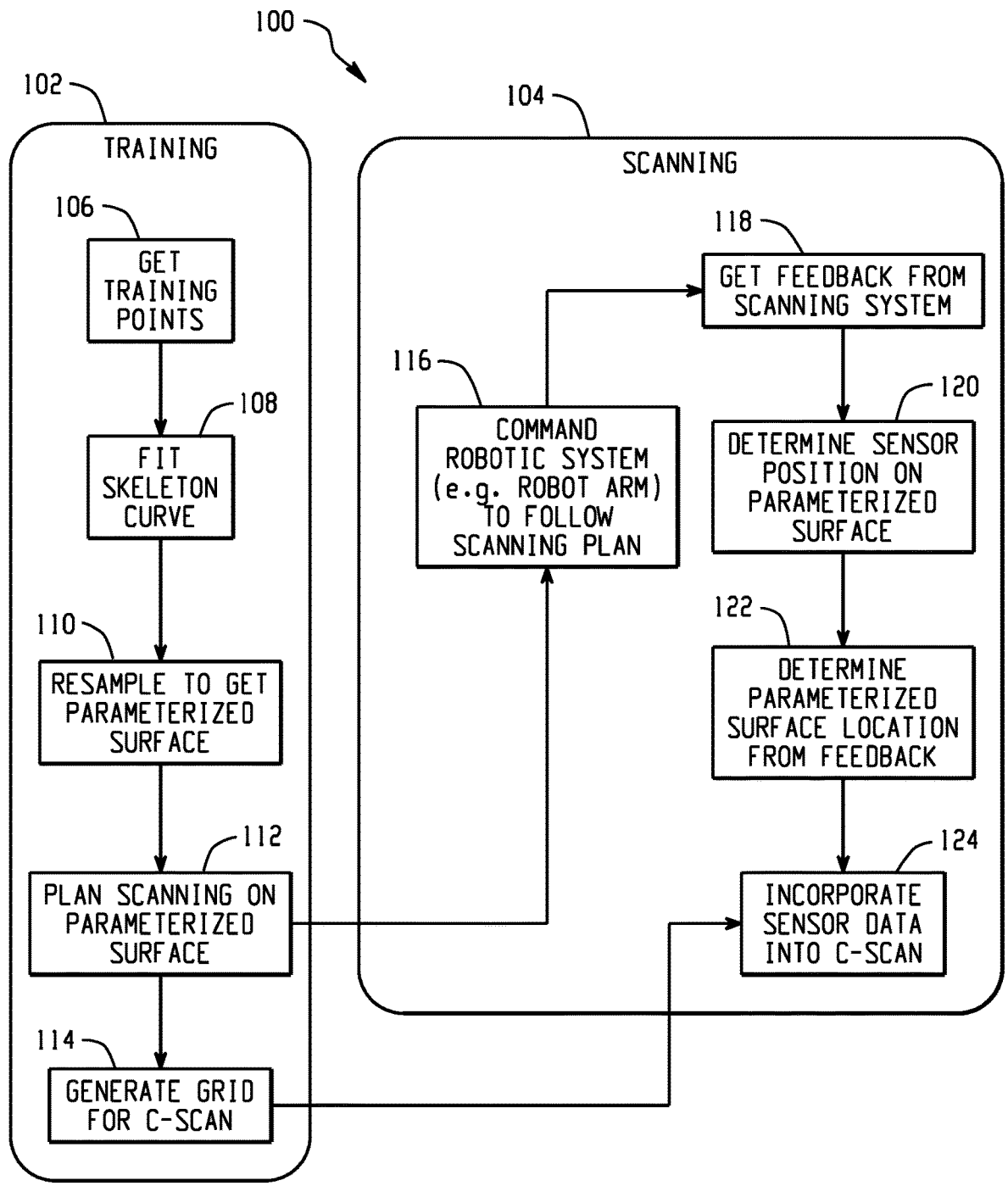
FIG. 1 is a flow diagram of an example computer-implemented method for generating a computer model of a three-dimensional object and using the computer model to collect measurement data in three-dimensional space and incorporate the measurement data into a plan view of the three-dimensional object.

FIG. 1 is a flow diagram of an example computer-implemented method 100 for generating a computer model of a three-dimensional object and using the computer model to collect measurement data in three-dimensional space and incorporate the measurement data into a plan view (e.g., C-Scan) of the three-dimensional object. The method 100 includes a training phase 102 and a scanning phase 104. During the training phase 102, a computer model of a three-dimensional object is generated that correlates points on the three-dimensional object with points in three-dimensional space. During the scanning phase 104, the computer model generated during the training phase 102 is used to collect measurement data of the three-dimensional object and associate the collected measurement data with points in three-dimensional space, and a plan view computer model of the three-dimensional object is generated that depicts the measurement data in two dimensions and that associates the depicted measurement data with points in three-dimensional space.

In embodiments, the training phase 102 obtains a sparse set of points to define the surface of the three-dimensional object, and parameterizes a smooth surface for the three-dimensional object with a two-dimensional (2D) scan grid and surface map. In embodiments, the scanning phase 104 uses the 2D scan grid and surface map generated during the training phase 102 to guide the movement of a sensor over the surface of the three-dimensional object and uses a synchronized feedback from the sensor to generate a C-Scan image of the surface of the three-dimensional object.

At step 106 of the illustrated embodiment, a plurality of training points are obtained for the target three-dimensional object. The training points may, for example, be obtained with a training probe device, such as the mechanical arm 200 shown in FIG. 2. To obtain a set of training points for a target object, a training probe is moved (for example using the mechanical arm shown in FIG. 2) to a number of points on the surface of the three-dimensional target object. The position of the training points on the surface of the target object may be selected to form a surface grid, however, in embodiments, it is not necessary for the training points to be precisely or evenly selected. For each training point on the surface of the target object, the position and orientation of the probe in three-dimensional space is recorded in a computer-readable data structure. In embodiments, the probe position and orientation data may be recorded along with other information relevant to the training probe device, such as the joint angles and orientation of the arm with respect to gravity.

Figure 2:
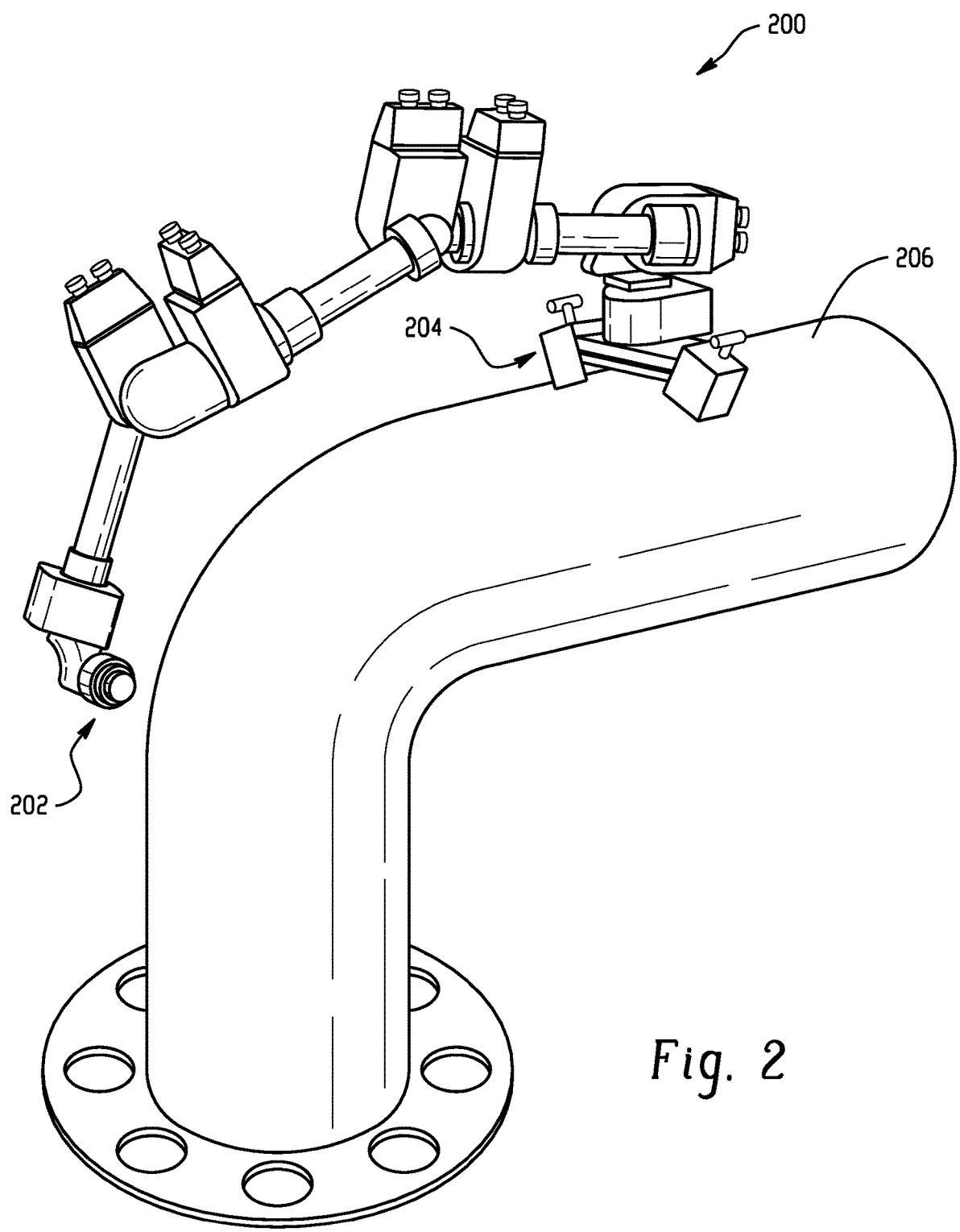
FIG. 2 is an example of a device for measuring training points in three-dimensional space for a computer model of a three-dimensional object.

With reference to the example shown in FIG. 2, the training probe 202 is attached at the end of a mechanical arm 200 that has a base structure 204 positioned on the target object 206 (which is a pipe elbow in the illustrated example). The mechanical arm 200 may, for example, be comprised of R-Series actuators that can be reconfigured depending on the size and shape of the surface of the target object 206 and/or other obstacles or constraints that may be present in the environment. In embodiments, the mechanical arm 200 may be a robotic arm that is moved to position the probe 202. In the case where the mechanical arm 200 is a robotic arm, the arm may, for example, be moved manually to each of the training points, or alternatively the end of the arm with the probe 202 could be steered remotely using a joystick or some other input.

In embodiments, the position of the arm base structure 204 may provide the training method 102 with a reference point in three-dimensional space for generating the training point position and orientation data. For example, the position of the arm base structure 204 may provide a zero reference point <0,0,0> in three-dimensional space, and coordinates <x,y,z> for the reference points may be generated by determining the three-dimensional position of the probe 202 with respect to the to the zero reference point <0,0,0>.

Figure 3:
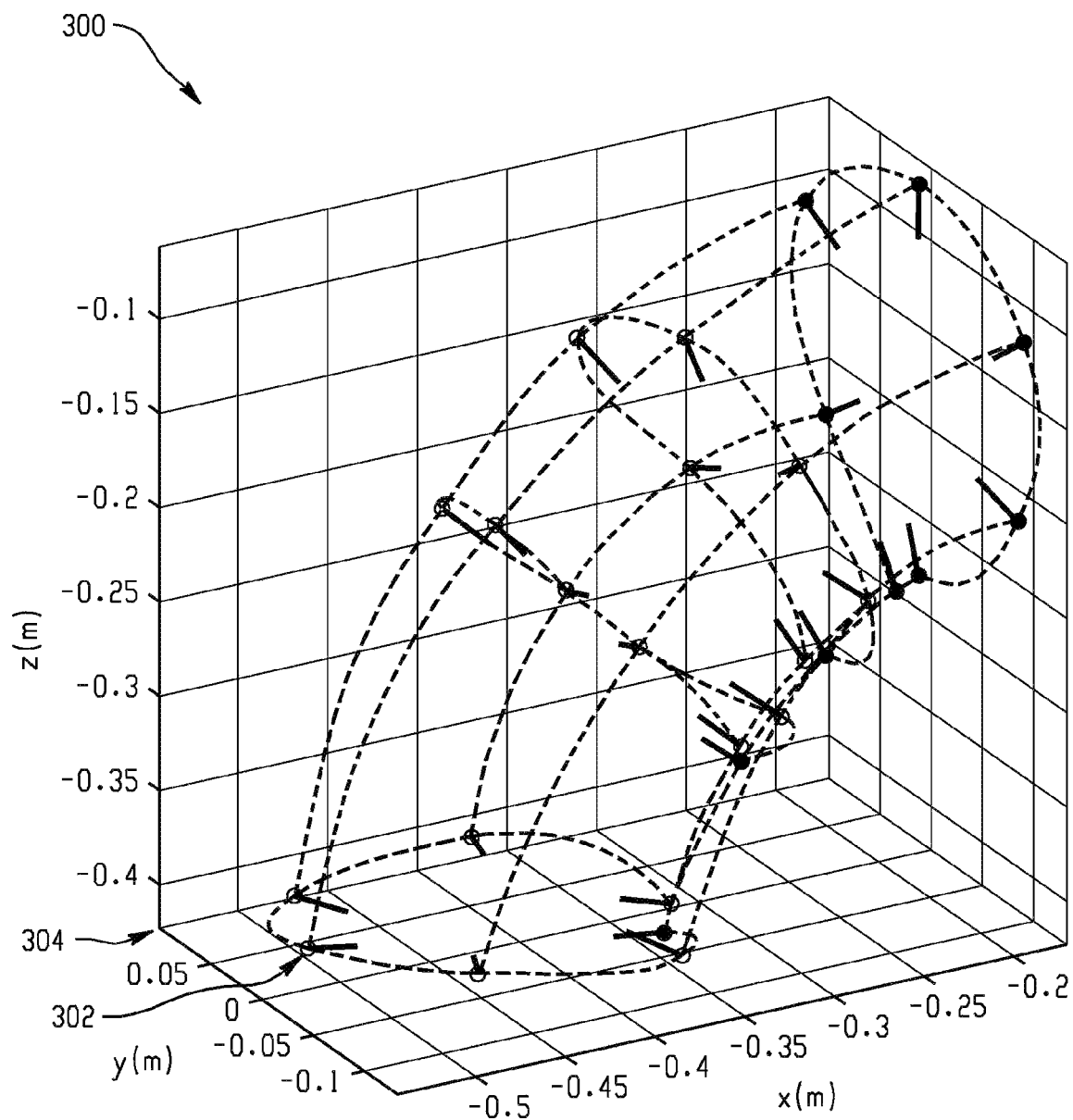
FIG. 3 shows an example of training points obtained for a three-dimensional object.

FIG. 3 shows an example set of training points 300 obtained for the surface of a three-dimensional object, for example using a probe as shown in FIG. 2. The surface of the three-dimensional object is illustrated by dotted lines in FIG. 3 and the training points are illustrated as circles along the surface. The training points 300 may be recorded in a computer-readable data structure as coordinates in three-dimensional space. For example, training point 302 in the illustrated example is recorded at coordinate <−0.5, 0.05, 0> with reference to the illustrated <x,y,z> coordinate axes. In the illustrated example, the zero reference point <0,0,0> for the coordinate axes is located at a point 304 that is not located on the target object. It should be understood, however, that in other examples the zero reference point <0,0,0> could instead be located at a point on the surface of the target object, for example at the base 204 of the mechanical arm 200 in FIG. 2.

The example set of training points 300 shown in FIG. 3 also includes probe orientation information for each training point. The probe orientation information identifies the orientation of the probe when capturing the training point location. In the illustrated example, the training points are shown as circles on the surface of the target object, and the probe orientation information is a vector extending from the training points in a direction normal to the surface of the target object. The direction of the probe orientation vectors is determined by the position of the sensor as it is placed onto the surface of the target object to record the training point positional data, and can be used to determine or approximate the direction of the target surface. For instance, in the illustrated example the target surface is approximately normal to the vectors at each training point location. The probe orientation vector information may be recorded in a computer-readable data structure along with the training point data.

Figure 4:
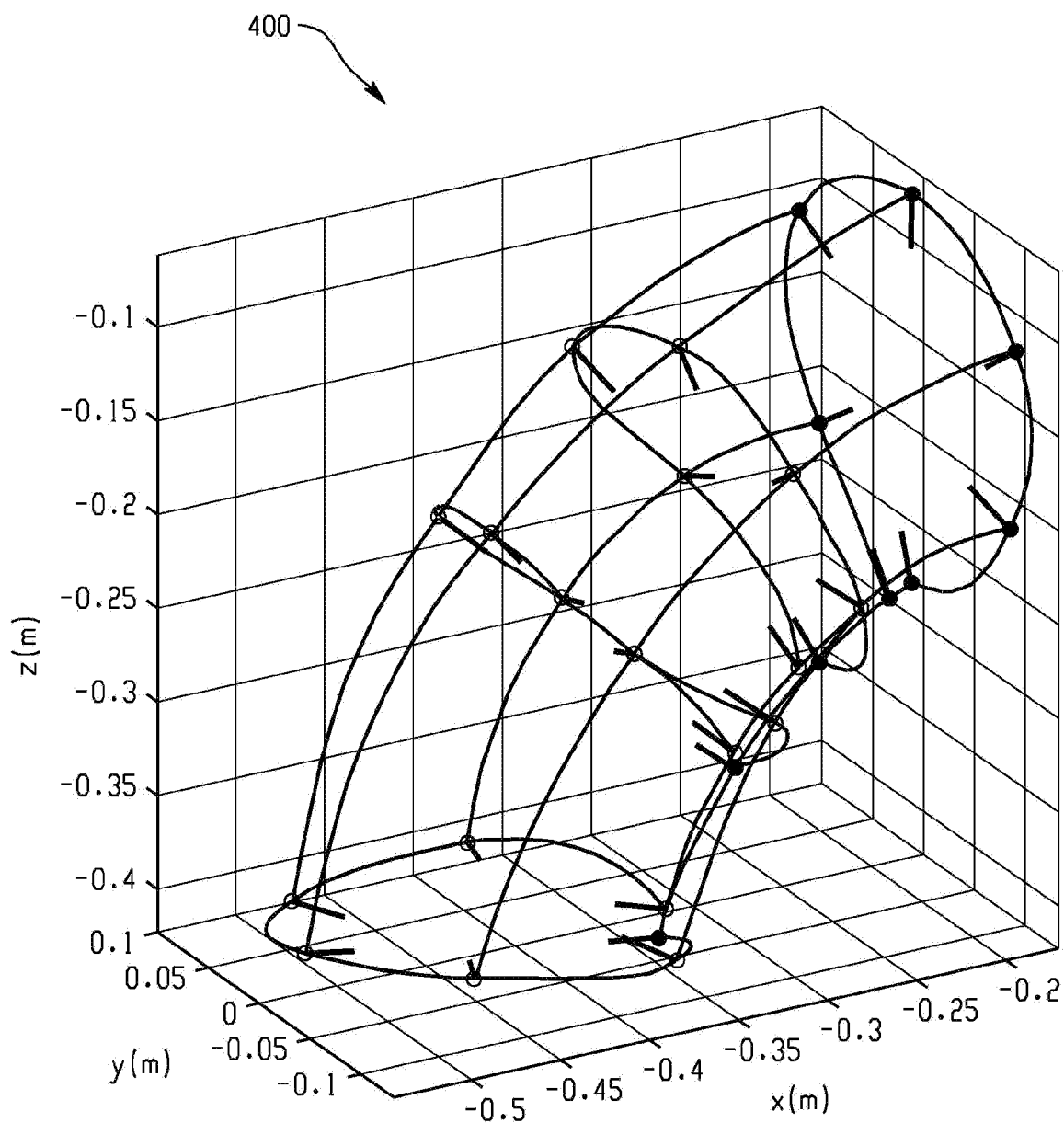
FIG. 4 shows an example of a set of skeleton curves generated for a three-dimensional object.

With reference again to FIG. 1, at step 108 the training point and probe orientation information is used to generate a set of skeleton curves 400 for the target three-dimensional object, as shown for example in FIG. 4. In embodiments, a texture (e.g., U-V) mapping process may be used to generate the set of skeleton curves 400 to smoothly connect the training points in two (U-V) dimensions of a two-dimensional projection of the surface of the three-dimensional object. In a texture (U-V) model, the skeleton curves 400 include two dimensions, parameterized by texture coordinates (U and V), similar to how latitude and longitude is used to parameterize the surface of the Earth. In this case, the skeleton curves 400 may be represented as piecewise polynomials that are generated using the recorded training point positional and probe orientation vector data.

Figure 5:
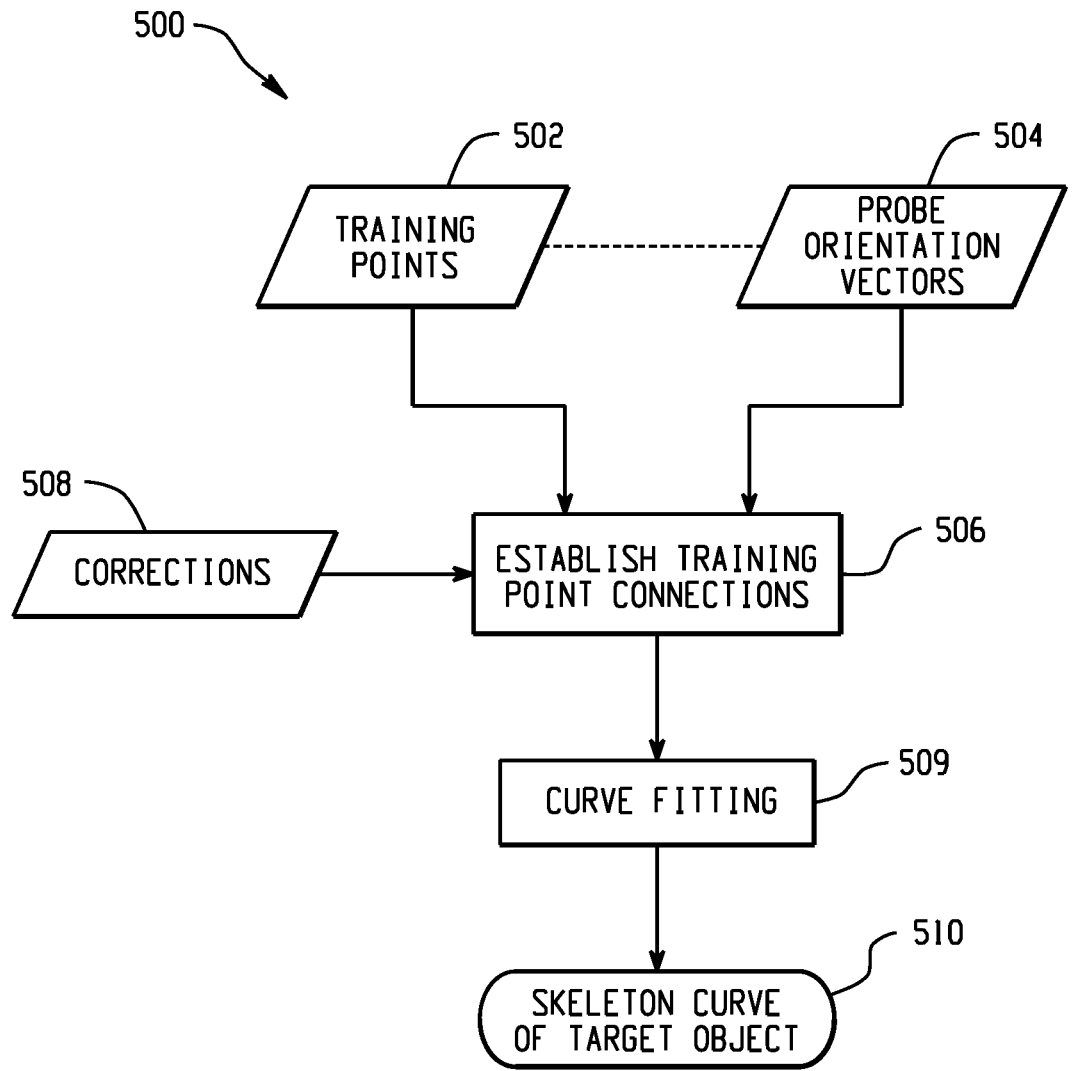
FIG. 5 is a flow diagram of an example computer-implemented method for generating a set of skeleton curves for a computer model of a three-dimensional object.

FIG. 5 shows an example method 500 for generating a skeleton curve model, which may be used at step 108 of FIG. 1. The method 500 receives a set of training points 502 for a target object along with probe orientation vector information 504 for each training point, for example as described above with reference to step 106 of FIG. 1 and FIG. 3. At step 506, the training points 502 and probe orientation vectors 504 are used to automatically establish connections between training points 502 along the surface of the target object, forming a rough skeleton model of the surface of the target object. Also at step 506, user input 508 may be received to make corrections to the rough skeleton model and/or one or more of the set of training points 502 or probe orientation vectors 504. For example, a user correction 508 may be made in the event that training points are automatically connected in a way that is not optimal or does not accurately reflect the surface of the target object. Then, at step 509, a curve fitting process is used to smooth the connections between training points to generate a smoothed skeleton curve 510 that better reflects the surface of the target object. This may be accomplished with continuous piecewise polynomials that respect both the position and surface normal of the training points.

Figure 6:
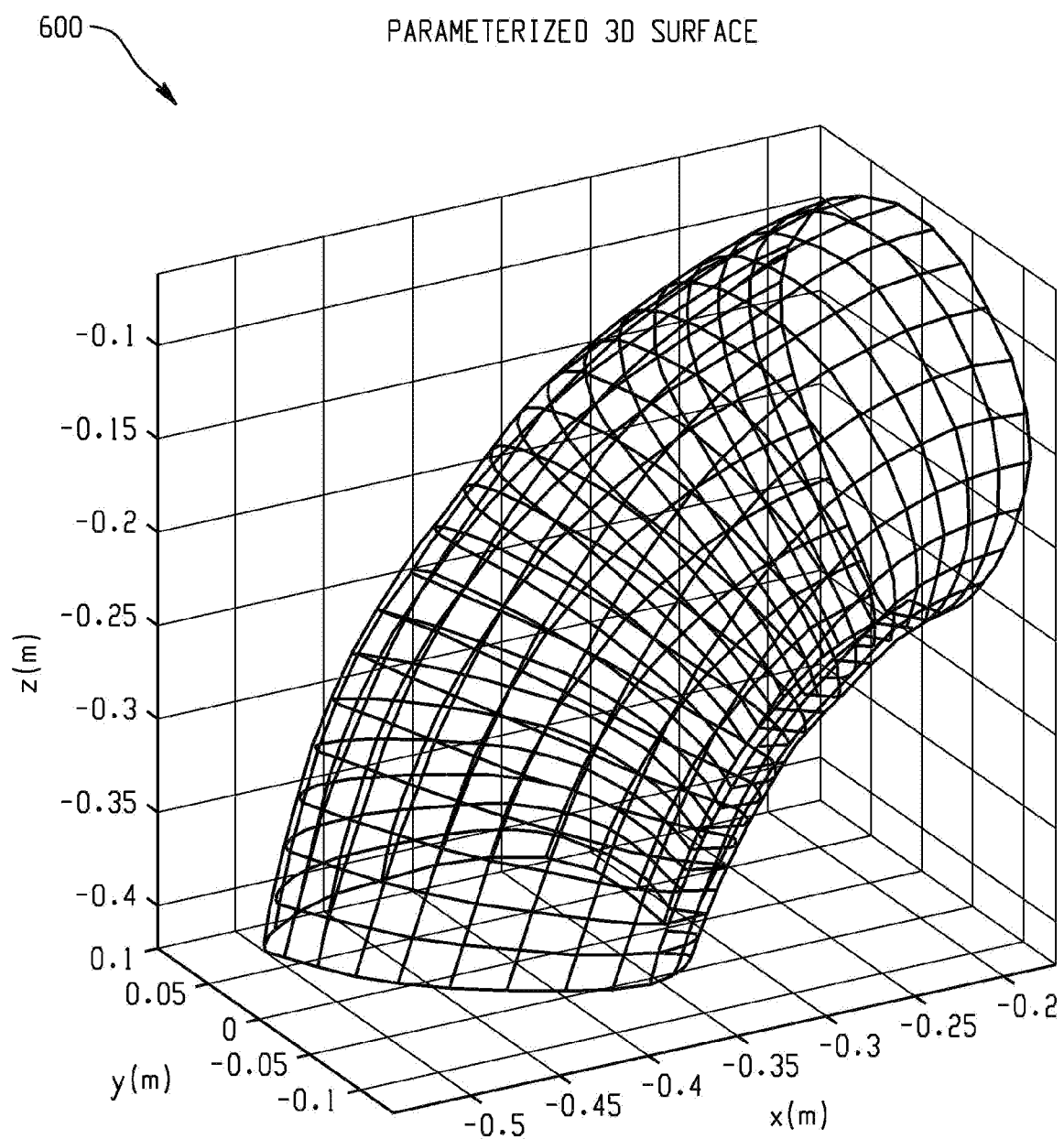
FIG. 6 is an example of a parameterized computer model for a three-dimensional object.

With reference again to FIG. 1, at step 110 the skeleton curve model is used to generate a parameterized surface model 600 for the three-dimensional target object, as shown in FIG. 6. The parameterized surface model 600 may include a new U-V grid of curves that is interpolated to maintain approximately even spacing as they cross each skeleton curve. Like the skeleton curves, the interpolated curves may be based on piecewise polynomials. These curves and normal vectors may be sampled to separately in U and V directions and then averaged to provide a grid parameterized in the U-V dimension, from which physical 3D positions of each point on surface can be generated.

Figure 7:
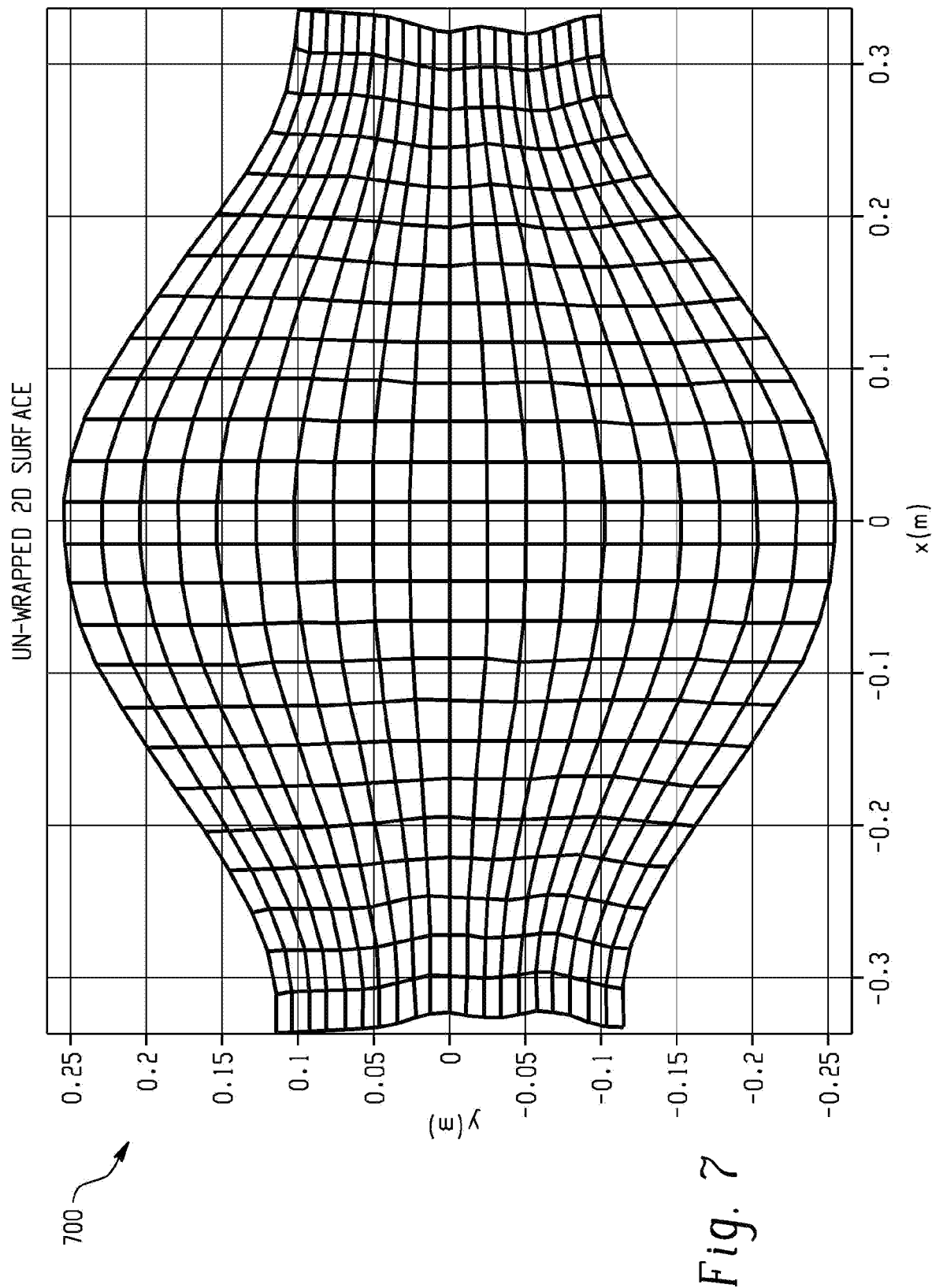
FIG. 7 is an example of a two-dimensional representation of a parameterized computer model of a three-dimensional object.

With reference again to FIG. 1, at step 110 a plan view 700 of the surface of the three-dimensional object is also generated from the parameterized surface model, as shown in FIG. 7. Like the three-dimensional view of the parameterized surface model (e.g., shown in FIG. 6), the plan view 700 shows a parameterized surface of the three-dimensional target object with an even grid in the parameterized U-V space. The plan view 700, however, is a two-dimensional view of the object surface that is the approximate 'unwrapped' surface of the three-dimensional object laid flat, similar to how a 2D map parameterized in latitude-longitude corresponds to the 3D surface of the Earth. For example, FIG. 7 illustrates an example plan view 700 of the parameterized surface model 600 shown in FIG. 6.

Figure 8:
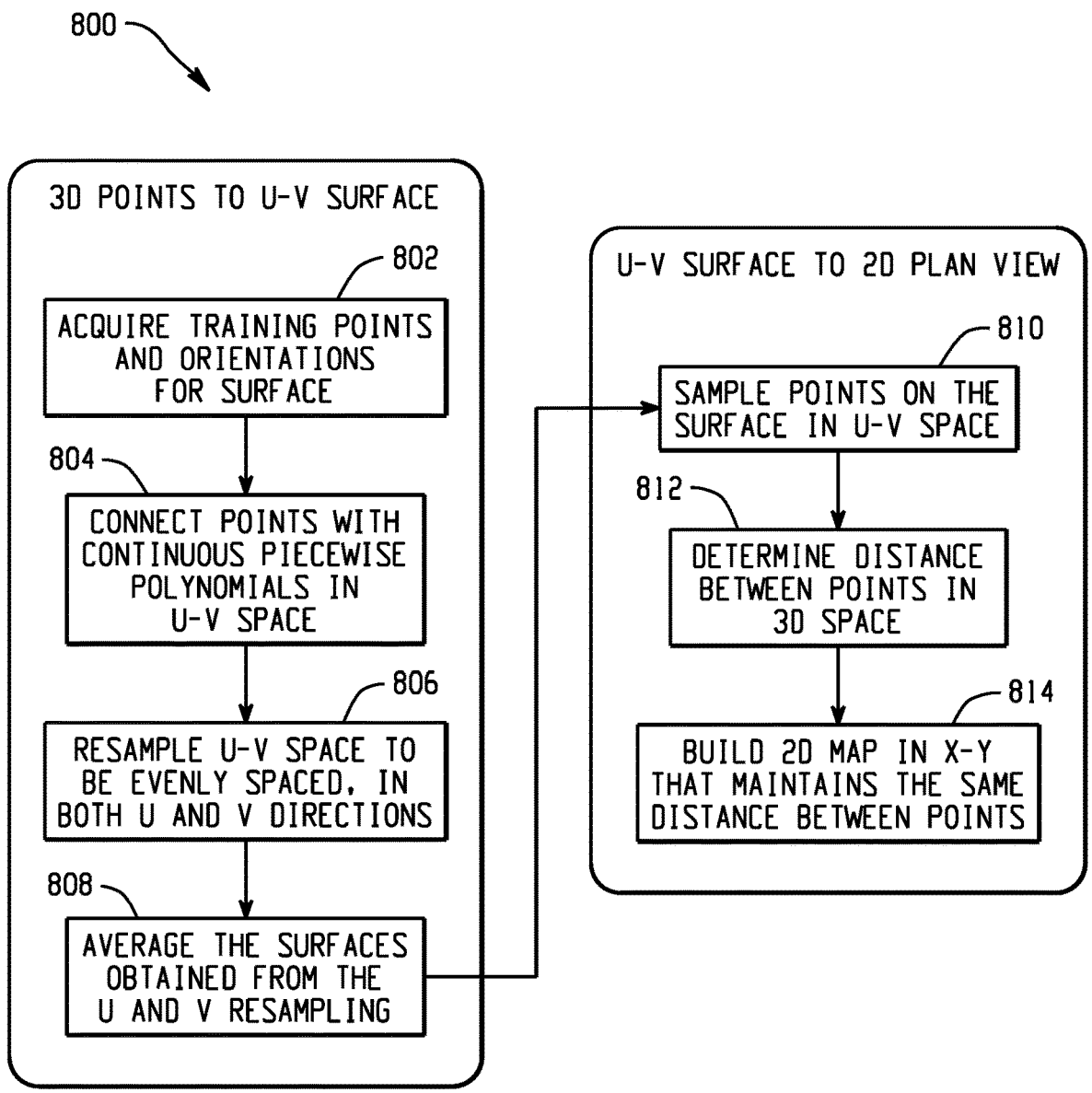
FIG. 8 is a flow diagram of an example computer-implemented method for generating a parameterized computer model from a set of skeleton curves for a three-dimensional object.

FIG. 8 shows an example method 800 for generating a parameterized surface model from a skeleton curve model, which may be used at step 110 of FIG. 1. At 802, training points and orientations are acquired for the surface. At 804, the training points are connected with continuous piecewise polynomials in U-V space. At 806, the U-V space is resampled to be evenly spaces in both U and V directions. Then, at 808, the surfaces obtained from U and V resampling are averaged to provide a grid parameterized in the U-V dimension (for example as shown in FIG. 6.)

A plan view of the surface of the three-dimensional object (for example as shown in FIG. 7) may then be generated using the method illustrated at steps 810, 812 and 814. At 810, a grid of points on the surface is sampled in U-V space. The distance between the points in the corresponding 3D space is determined at 812. Then, at 814, a 2D map (i.e., plan view) can be generated using iterative methods where the points in 2D space are best fit to respect the distances along the surface in 3D space. One method of achieving this can be to fix the meridians of the plan view to be straight lines in X and Y and shift the rest of the points to match their respective distances in 3D space.

Figure 9:
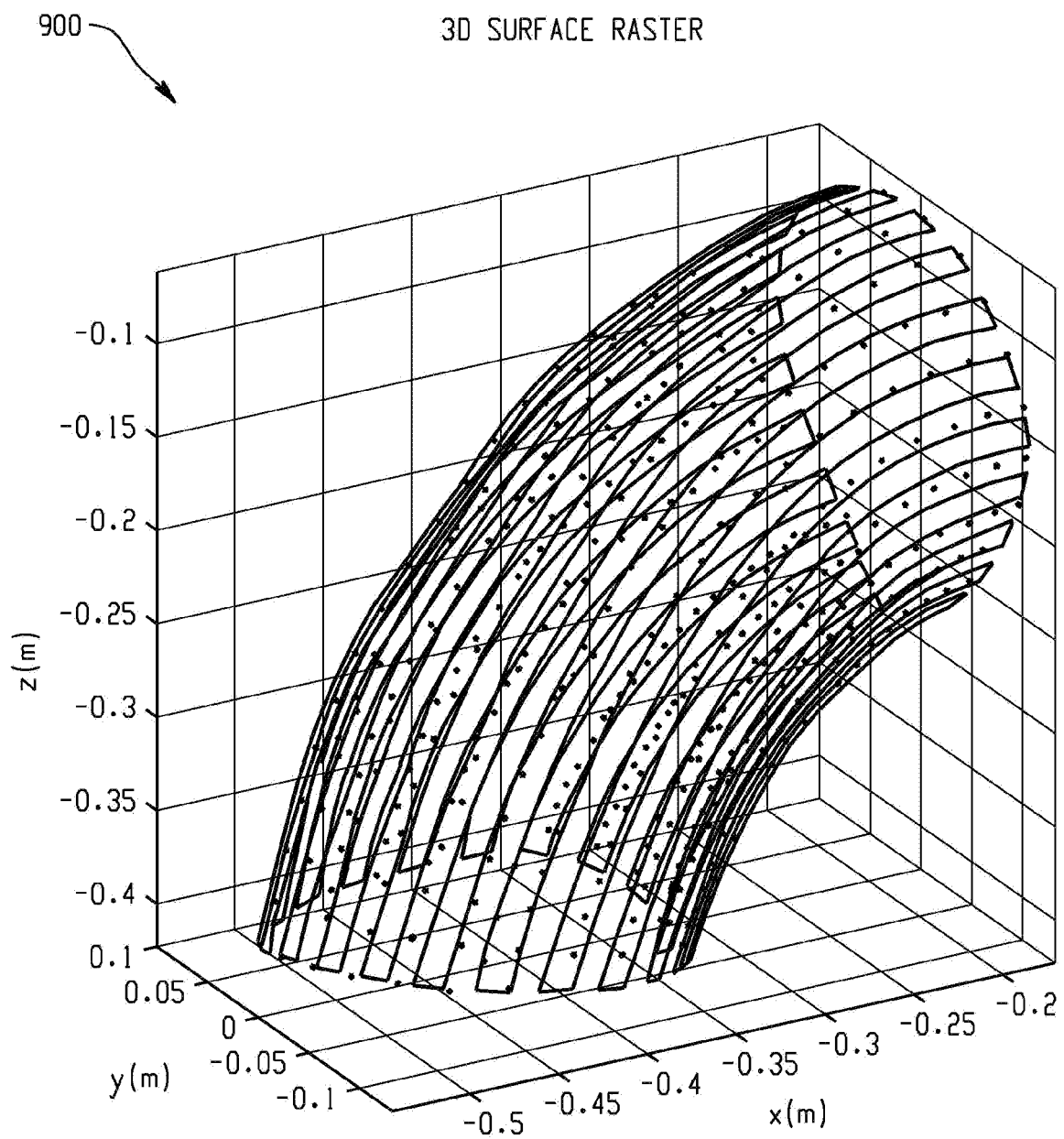
FIG. 9 is an example of a scan raster generated from a computer model of a three-dimensional object.

With reference again to FIG. 1, at step 112 a planned scan raster pattern 900 is generated from the parameterized surface model, for example as shown in FIG. 9. The scan raster pattern 900 is a planned scanning path for automated scanning of the surface of the target object (e.g., a pipe elbow in the example of FIG. 9). The planned scan raster pattern 900 is generated from the parameterized surface model, and therefore may also be defined in two U-V dimensions along the surface of the target object. In embodiments, the raster pattern 900 may be generated as straight lines in U-V space (resulting in curved lines in 3D space), as shown in the example 900 depicted in FIG. 9. During the scanning phase 104, automated scanning of the target object may be performed by following the back-and-forth scan lines defined by the scan raster pattern 900. In embodiments, the spacing and direction of the scan raster pattern 900 may be adjusted as desired. For simplicity, the raster pattern can be planned with straight lines in U-V space. Although this will not necessarily provide an even raster in X-Y space along the surface, a maximum raster width can still be ensured. Additionally, a decision of whether to raster in the U or V direction can be made depending on the surface to minimize the unevenness in X-Y and provide more even coverage. Alternatively, various raster coverage algorithms can be applied in X-Y space.

Figure 10:
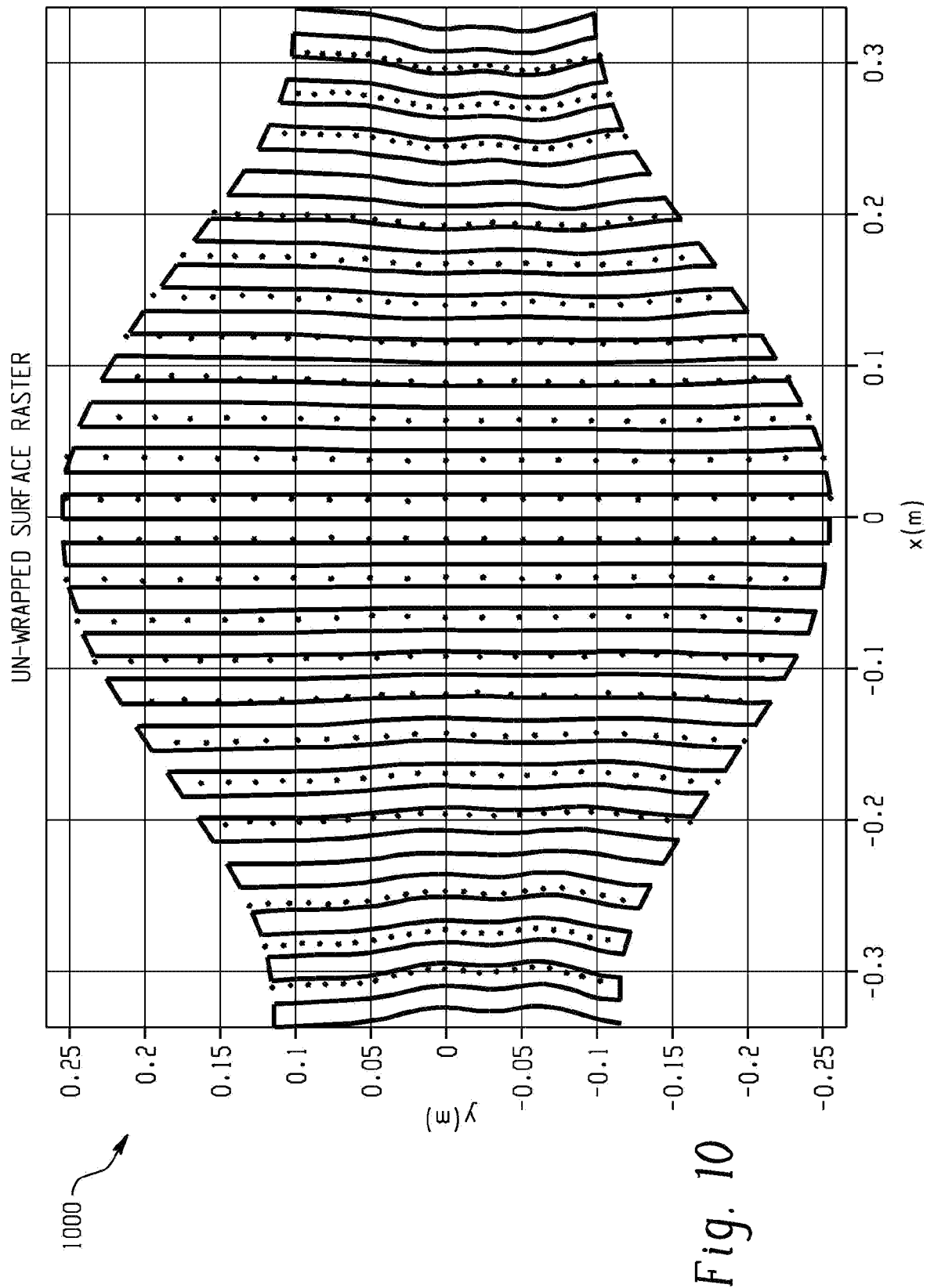
FIG. 10 is an example of a two-dimensional representation of a scan raster generated from a computer model of a three-dimensional object.

In addition, a two-dimensional view of the planned scan raster pattern 1000 may also be generated at step 112, for example as shown in FIG. 10. The two-dimensional view of the scan raster pattern 1000 may, for example, be generated from the U-V dimensions of the scan raster pattern 900. Similar to the plan view of the parameterized surface, the two-dimensional scan raster pattern 1000 is a view of the raster pattern projected on a two-dimensional surface that is the approximate 'un-wrapped' surface of the three-dimensional object laid flat, similar to how a 2D map parameterized in latitude-longitude corresponds to the 3D surface of the Earth. In the case where the scan raster pattern is generated as straight lines in U-V space, the resulting two-dimensional view of the scan raster pattern 1000 may include curved lines, as shown in the example depicted in FIG. 10. Despite this variation, the spacing of the rasters in the 2D surface map 1000 can be set so that they are at least of a certain density, depending on the needs of the inspection.

At step 114, a C-scan grid may be generated that is approximately evenly spaced in 2D metric X-Y space along the surface of the target object. The C-scan grid may be used during the scanning phase 104 to build 3D (FIG. 11) and 2D (FIG. 12) C-scan images for the target object. In embodiments, the density of the C-scan grid can be set independently of the raster paths, allowing the raster motion to pass through each C-Scan grid cell multiple times to help ensure a better inspection. The density of the C-scan grid can be set to a fine enough value to ensure a full-coverage inspection of a certain density in the presence of uncertainty in the position of the measure sensor. To generate the C-scan grid, grid X-Y positions are sampled at the desired density, and gradient descent, or another similar method, can be used to find the closest point in U-V space to the 2D X-Y position on the C-scan grid. Once the U-V positions of the grid are determined, they can also be used to create a corresponding 3D surface grid or texture map the 2D C-scan one the 3D surface.

During the scanning phase 104, the 3D and/or 2D raster scan patterns may be used to move one or more measurement sensors along the surface of the target object to collect measurement data. In embodiments, the one or more measurements sensors may include non-destructive testing (NDT) sensors for measuring the thickness of the material under the surface or other characteristics of the target object. Example sensors include ultrasonic transducers (UT), electro-magnetic acoustic transducers (EMAT), pulsed eddy current (PEC), magnetic flux leakage (MFL) and many others.

At step 116 of the scanning phase 104 shown in FIG. 1, the raster scan pattern is used to move the measurement sensor along the surface of the target object in a way that fully scans the surface up to a specified resolution. In embodiments, the measurement sensor may be included on a robotic arm or other mechanism for using the raster scan pattern to automatically move the measurement sensor along the surface of the target object. In other embodiments, the raster scan pattern may be used to guide a user in manually moving a measurement sensor along the surface of the target object. Examples of mechanisms that may be used to automatically and/or manually move one or more measurement sensors along the surface of the target object are described below with reference to FIGS. 13-17.

At step 118, feedback is received from the measurement sensor as the sensor is moved along the surface of the target object. The feedback from the measurement sensor may include positional data for the sensor that is used, at step 120, to calculate the orientation of the sensor in 3D space, e.g., the full 6-DoF pose (position and orientation) of the measurement sensor. As described below with reference to the examples shown in FIGS. 13-17, the positional data for the measurement sensor may be obtained from various sources, such as a GPS system on a mobile measurement device, a reference-based spatial orientation system on a mechanical arm or other robotic mechanism, or other types of spatial-orientation systems or mechanisms associated with the measurement sensor.

At step 122, the pose of the measurement sensor may be used to find the closest point on the scan surface in U-V space. This may be accomplished by using gradient descent, or another similar method, to minimize the distance of the measurement sensor to a point on the scan surface in order to find the closest point in U-V space to the 3D pose of the measurement sensor. With the U-V location of the measurement sensor determined, the position of the measurement sensor on the 2D and/or 3D surface maps of the target object can also be determined. The positional data for the measurement sensor is associated with measurement data (e.g., UT scan data) that is received from the measurement sensor, for example by associating the positional data and measurement data in a data structure stored in a computer-readable medium.

Figure 11:
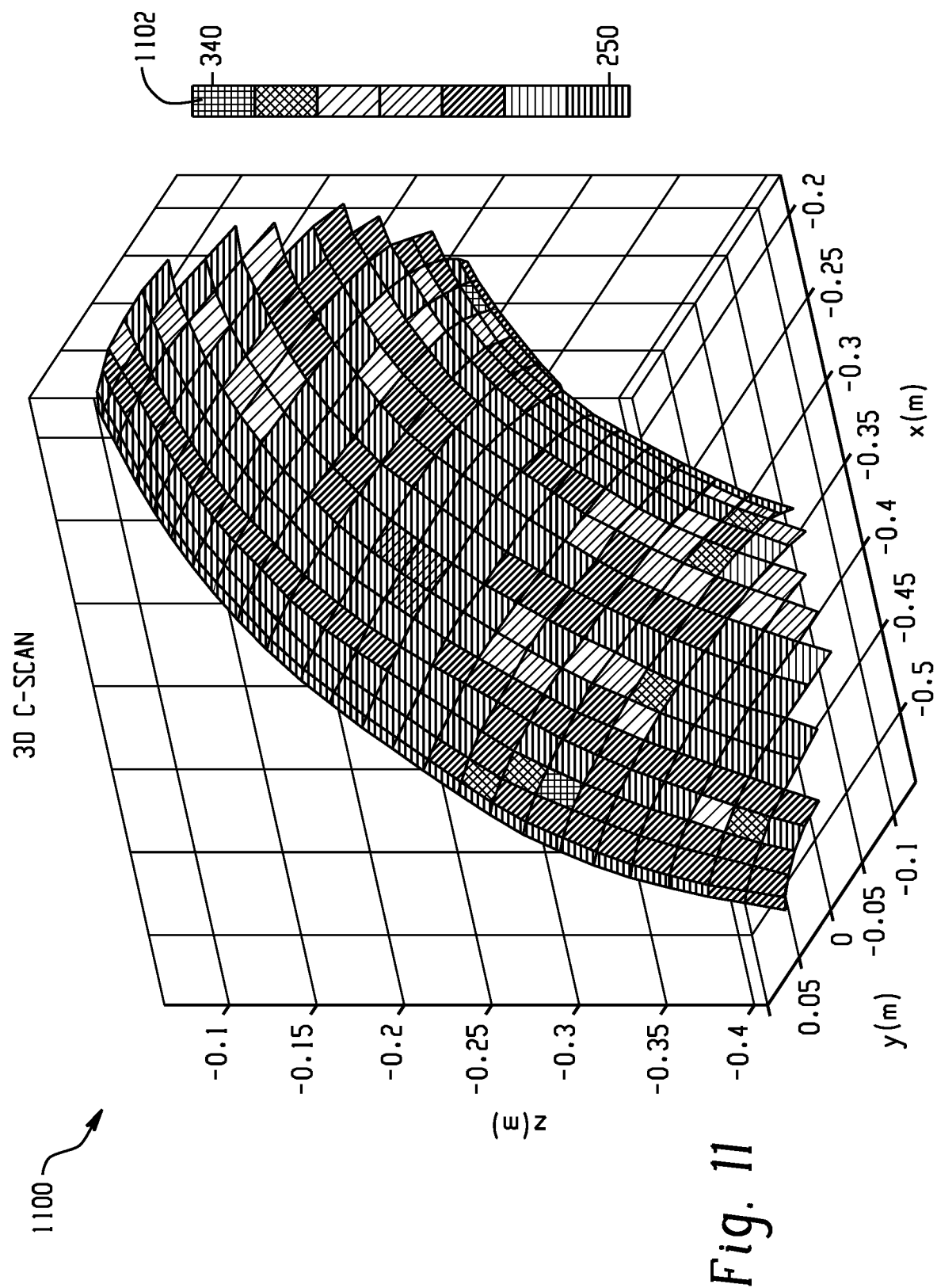
FIG. 11 is an example of sensor measurement data displayed on a three-dimensional view generated from a computer model of a three-dimensional object.
Figure 12:
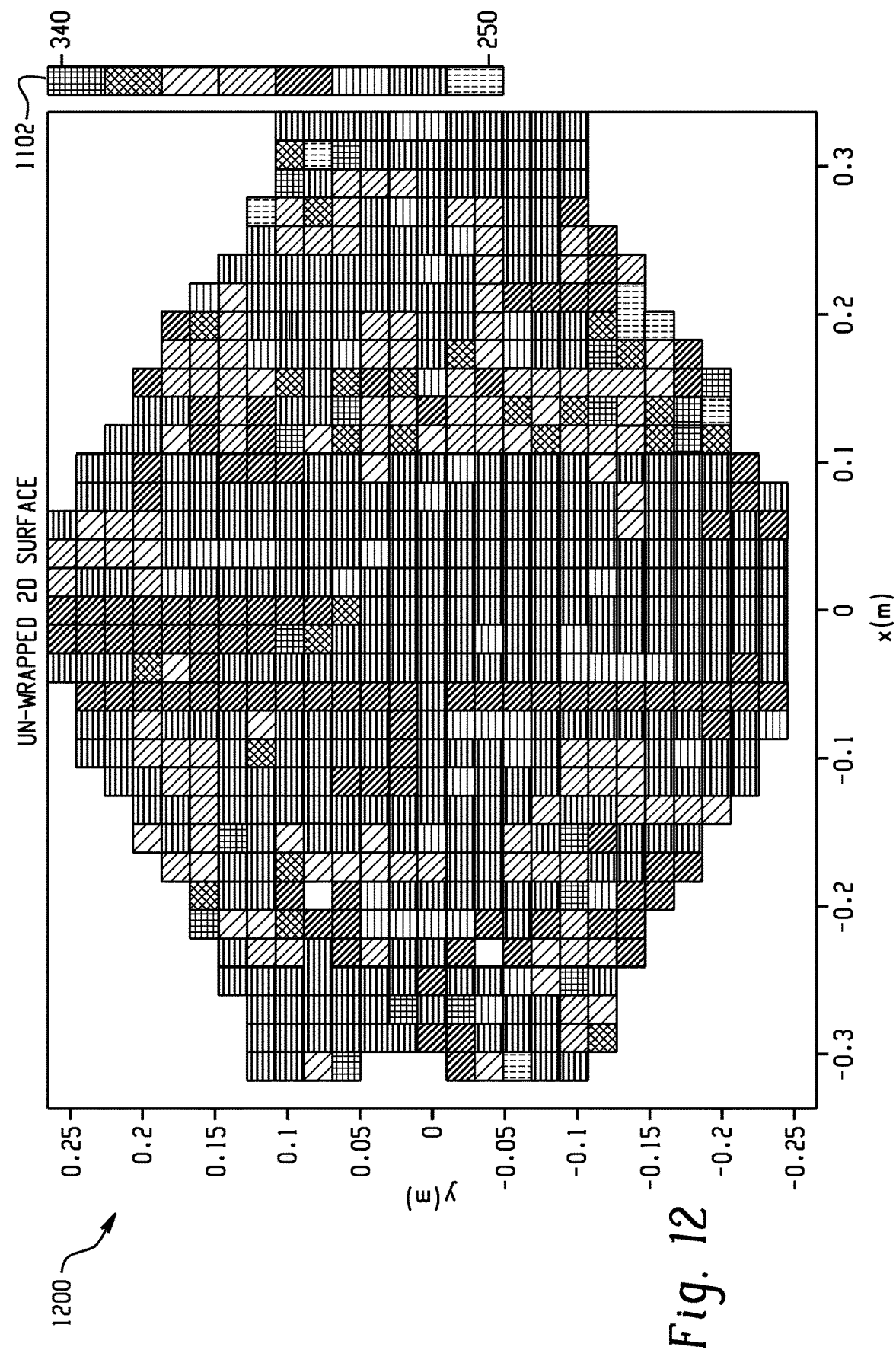
FIG. 12 is an example of sensor measurement data displayed on a plan view generated from a computer model of a three-dimensional object.

At step 124, the sensor positional data and measurement data is used to populate cells in the C-Scan grid generated during the training phase (at step 114). In embodiments, the C-Scan grid may be used in this way to generate both a 3D C-Scan image 1100 and a 2D C-Scan 1200 image, for example as shown in FIGS. 11 and 12 respectively. In embodiments, as multiple measurement sensor readings are collected within a C-Scan grid cell, the measurement readings can be averaged or processed in a way that is desired for the particular inspection. For example, in embodiments, the measurement data may be processed for inclusion in the C-Scan image by taking the mean, median, minimum, or maximum values that are recorded within that cell.

In the C-Scan images, the measured characteristics of the target device (e.g., the thickness of the pipe) may be shown by color-coded pixels in a 2D (X-Y) and/or 3D (X-Y-Z) plot showing the location on the surface of the target object. For instance, in the example shown in FIG. 11, measured thickness readings of the target object are displayed on a 3D view 1100 of the C-Scan grid. Similarly, in FIG. 12, measured thickness readings of the target object are displayed on a 2D view 1200 of the C-Scan grid. In each case, each pixel in the C-Scan image may be color-coded to correspond with color-coded measurement readings on a measurement scale 1102. In the illustrated black-and-white drawings, the color-coded measurement readings are shown using gray scale. It should be appreciated that color-coded 2D C-Scan images are commonly used in industrial NDT inspection. In other embodiments, however, instead of using color, the C-Scan images could be displayed using gray-scale or some other way to visually differentiate different levels of a measurement scale.

Figure 13:
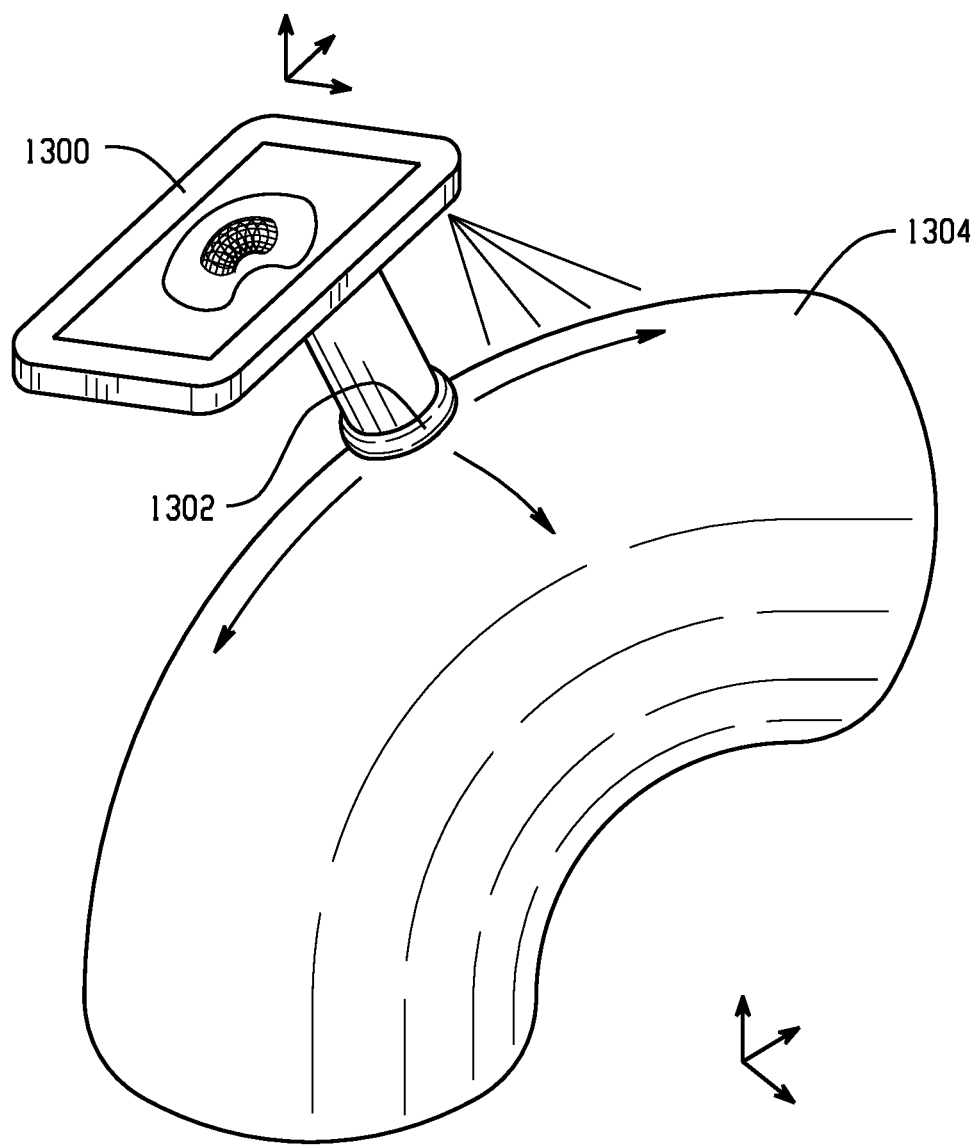
FIG. 13 shows an example of an augmented-reality enabled device attached to a probe for inspecting the surface of an object.

FIG. 13 shows an example of an augmented-reality (AR) enabled device 1300 attached to a measurement sensor 1302 for inspecting the surface of an object 1304. The AR enabled device 1300 may be a special purpose computing device, such as a tablet computer or other computing device that is configured to be attached to a probe with a measurement sensor 1302. The AR enabled device 1300 may be used to display a raster scan pattern of the object 1304 and use the raster scan pattern to help guide the measurement probe 1302 over the surface of the object 1304. The AR enabled device 1300 may, for example, include positioning software that is configured to track the position of the AR enabled device 1300 in 3D space in relation to the position of the object 1304, such that the AR enabled device 1300 can track and display the location of the probe 1302 as it is moved over the surface of the object 1304. The AR enabled device 1300 may, for example, use the position information to guide the measurement probe 1302 along the displayed raster scan pattern over the surface of the object 1304.

The AR enabled device 1300 may be further configured to receive and record measurement data from the measurement sensor 1302 as it is moved over the surface of the object 1304. In embodiments, the AR enabled device 1300 may display a representation of the received measurement data, for example as an overlaid image on a representation of the surface of the object 1304. In one example, the AR enabled device 1300 may be configured to display a C-Scan image of the object, as described above, and populate measurement data into the C-Scan image as the measurement probe 1304 is passed over the surface of the object 1304.

Figure 14:
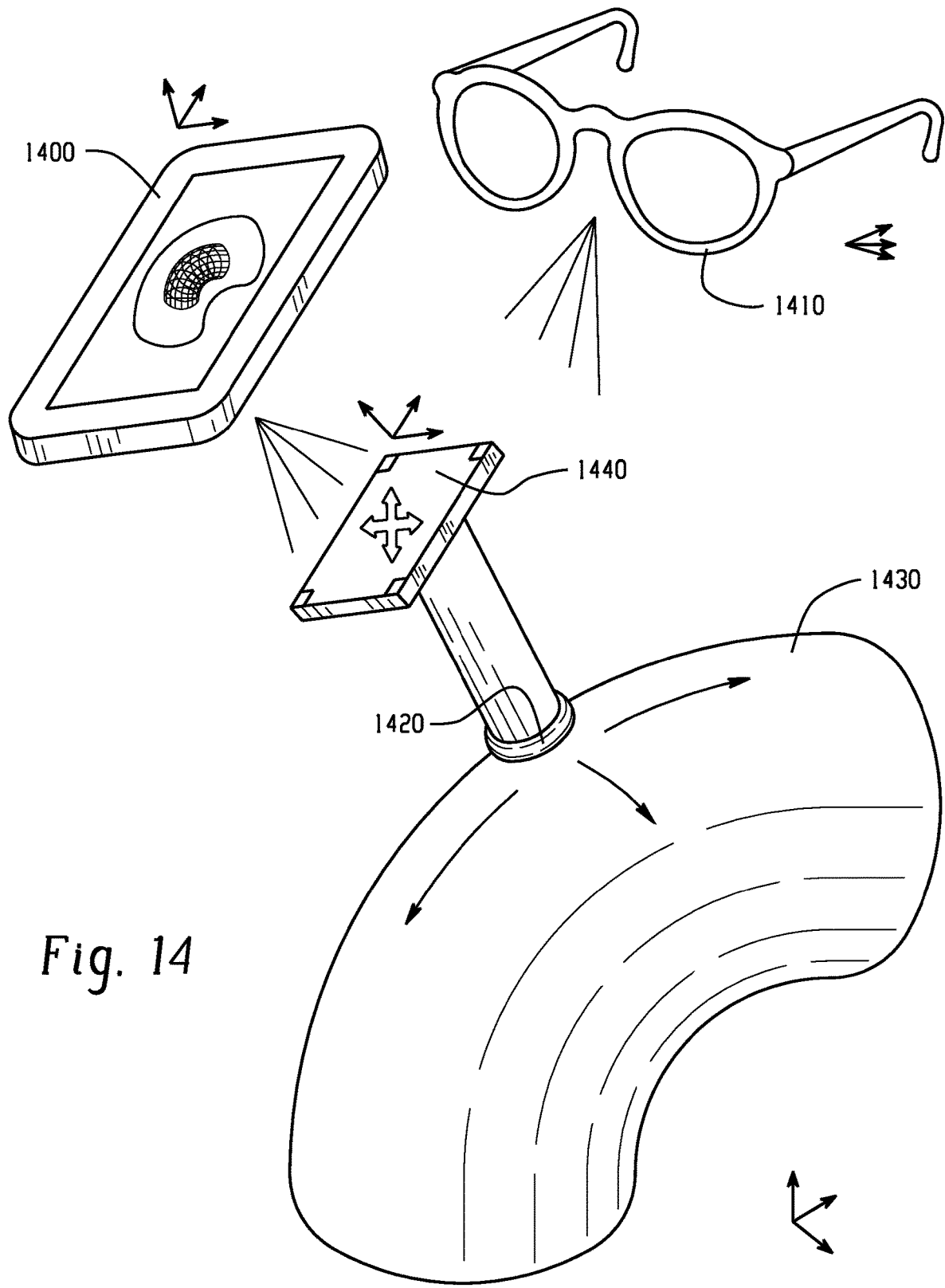
FIG. 14 shows examples of augmented-reality enable devices for monitoring the motion of a probe in inspecting the surface of an object.

FIG. 14 shows examples of a remote AR enable device 1400, 1410 for monitoring the motion of a measurement sensor 1420 in inspecting the surface of an object 1430. In this example, the AR enabled device 1400, 1410 is separate from the measurement probe 1420 and is configured to remotely track the motion of the measurement probe 1420 as it is moved over the surface of the object 1430. The illustrated examples of a remote AR enabled device include an AR enabled wireless computing device 1400, such as a tablet computer or smart phone, and an AR enabled headset 1410, such as a pair of smart glasses.

In operation, the remote AR enabled device 1400, 1410 may be configured to track the location of the measurement probe 1420 using a visual fiducial 1440 attached to the probe. The remote AR enabled device 1400, 1410 may be configured to measure its own pose in 3D space (for example using a GPS system), and also to measure the relative pose of the measurement probe 1420. The remote AR enabled device 1400, 1410 may then use this positioning data to display a raster scan pattern of the object 1430 and use the raster scan pattern to help guide the measurement probe 1420 over the surface of the object 1430. In embodiments, the movement of the measurement probe 1420 over the surface of the object 1430 may be either manual or automated (e.g., robotic).

Figure 15:
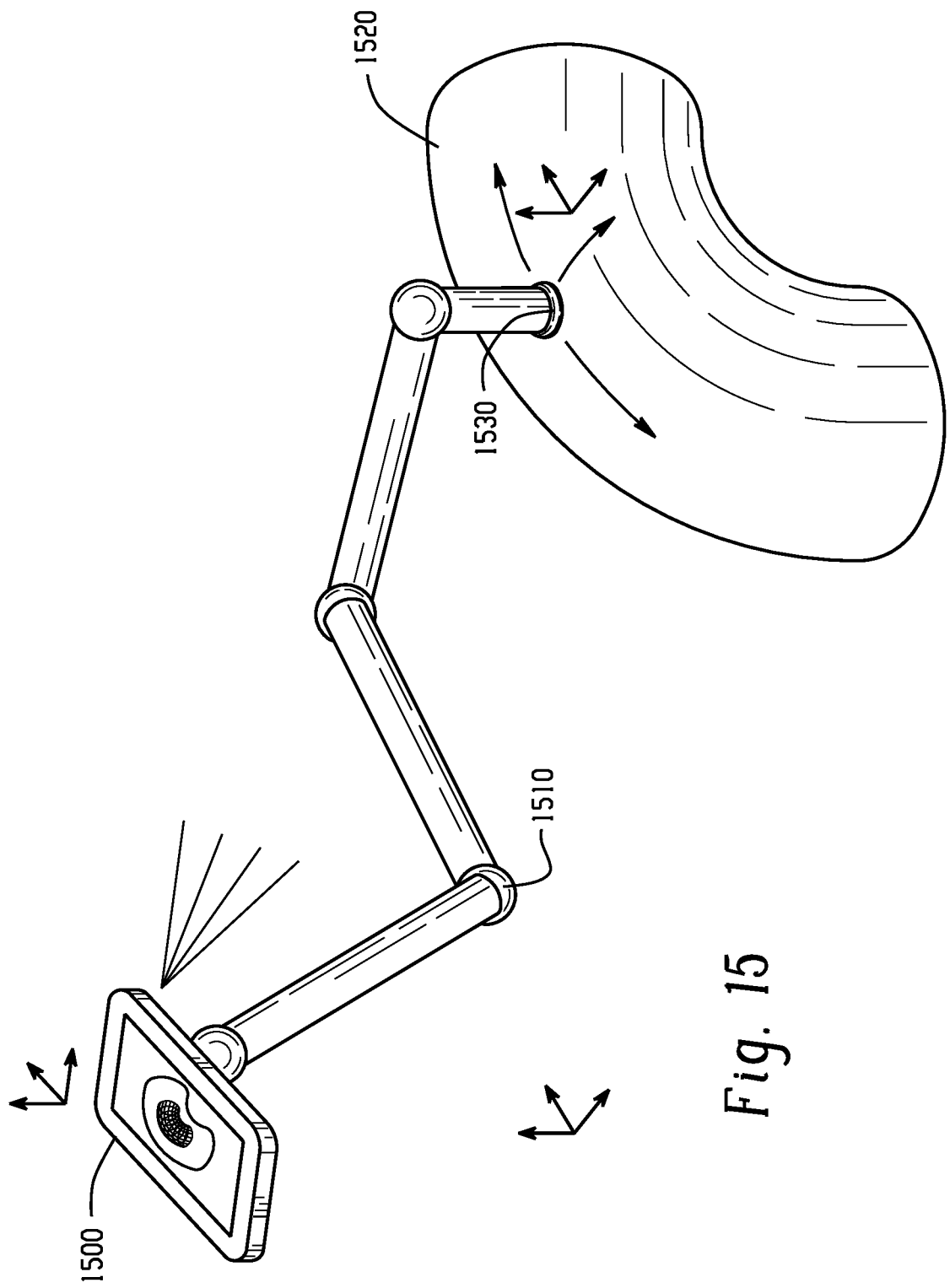
FIG. 15 shows an example of an augmented-reality enable device attached to a segmented mechanical arm for inspecting the surface of an object.

FIG. 15 shows an example of an AR enable device 1500 attached to a segmented mechanical arm 1510 for inspecting the surface of an object 1520. In this example, a measurement sensor 1530 is attached to an end of the segmented mechanical arm 1510, and the attached AR enabled device 1500 is configured to track the motion of the measurement probe 1530 as it is moved over the surface of the object 1520 based on the position and movement of the mechanical arm 1510 in 3D space.

In an embodiment, the AR enabled device 1500 may be configured to measure its own pose in 3D space (e.g., the pose at which the device 1500 is connected to the base of the mechanical arm), for example using a GPS system, and the mechanical arm 1510 may be configured to determine the position of the measurement sensor 1530 relative to the AR enabled device 1500. For example, sensors on the mechanical arm 1510 may be used to measure the position of each joint, and the sensor data may be used along with physical parameters of a mechanical arm 1510 to calculate the position of the probe 1530 using forward kinematics, which is the process of using the measured joint angles of the arm along with geometric information about the arm's configuration (link lengths, joint orientations, etc.) to calculate the position and orientation of the end of the arm relative to the base, which is rigidly attached to the AR enabled device. The AR enabled device 1500 may then use this positioning data to display a raster scan pattern of the object 1520 and use the raster scan pattern to help guide the mechanical arm 1510 in moving the measurement probe 1530 over the surface of the object 1520. In embodiments, the movement of the mechanical arm 1510 may be either manual or automated (e.g., robotic).

Figure 16:
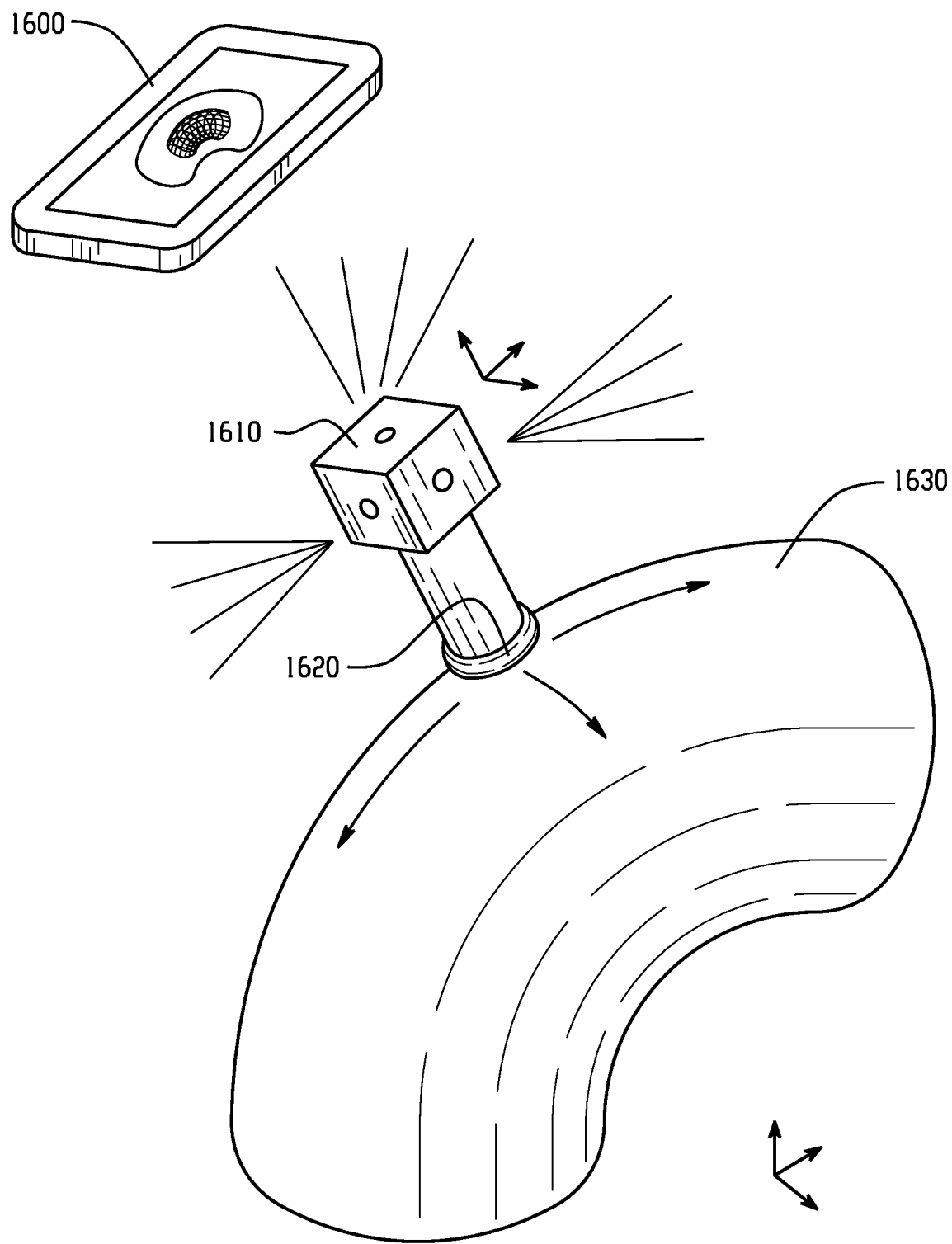
FIG. 16 shows an example of an augmented-reality enabled device that wirelessly communicates with a probe for inspecting the surface of an object.

FIG. 16 shows an example of a remote AR enabled device 1600 that wirelessly communicates with a measurement sensor probe 1610 for inspecting the surface of an object. In this example, the pose of the measurement sensor 1620 in 3D space in relation to the object 1630 is determined by a processor on the measurement probe 1610, and the position data is wirelessly transmitted from the measurement probe 1610 to the remote AR enabled device 1600. The AR enabled device 1600 may then use the positioning data to display a raster scan pattern of the object 1630 and use the raster scan pattern to help guide the measurement sensor 1620 over the surface of the object 1630. Similar to the example described in FIG. 13, the remote AR enabled device 1600 may be further configured to receive and record measurement data from the measurement sensor 1620, and display the received measurement data on a representation of the surface of the object 1630, for example as a C-Scan image.

Figure 17:
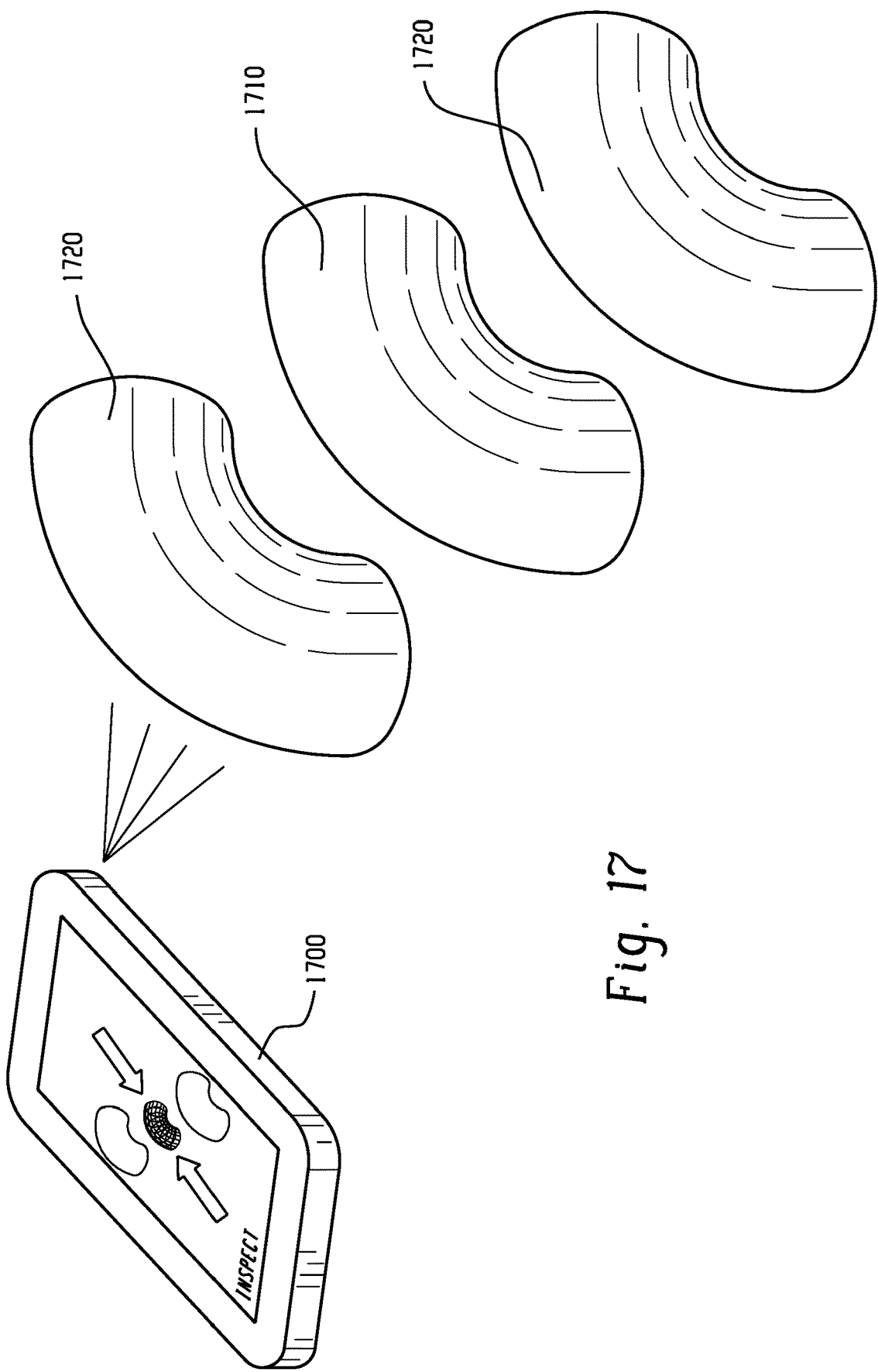
FIG. 17 shows an example of an augmented-reality enabled device used with a stored computer model for an object.

FIG. 17 shows an example of an AR enabled device 1700 used with a stored computer model for an object. In this example, a raster scan pattern for an object is stored in memory on the AR enabled device 1700, and is used to display the stored raster scan pattern on an image of a similar object 1710. The displayed raster scan pattern may be used to help guide a measurement sensor (not shown) over the surface of the object 1710. In other embodiments, a stored raster scan pattern for the object 1710 may be used by the AR enabled device 1700 to help identify the proper object for inspection. For instance, in the illustrated example, a stored raster scan pattern of the target object 1710 may be used to help distinguish the object from similar objects 1720.

Figure 18:
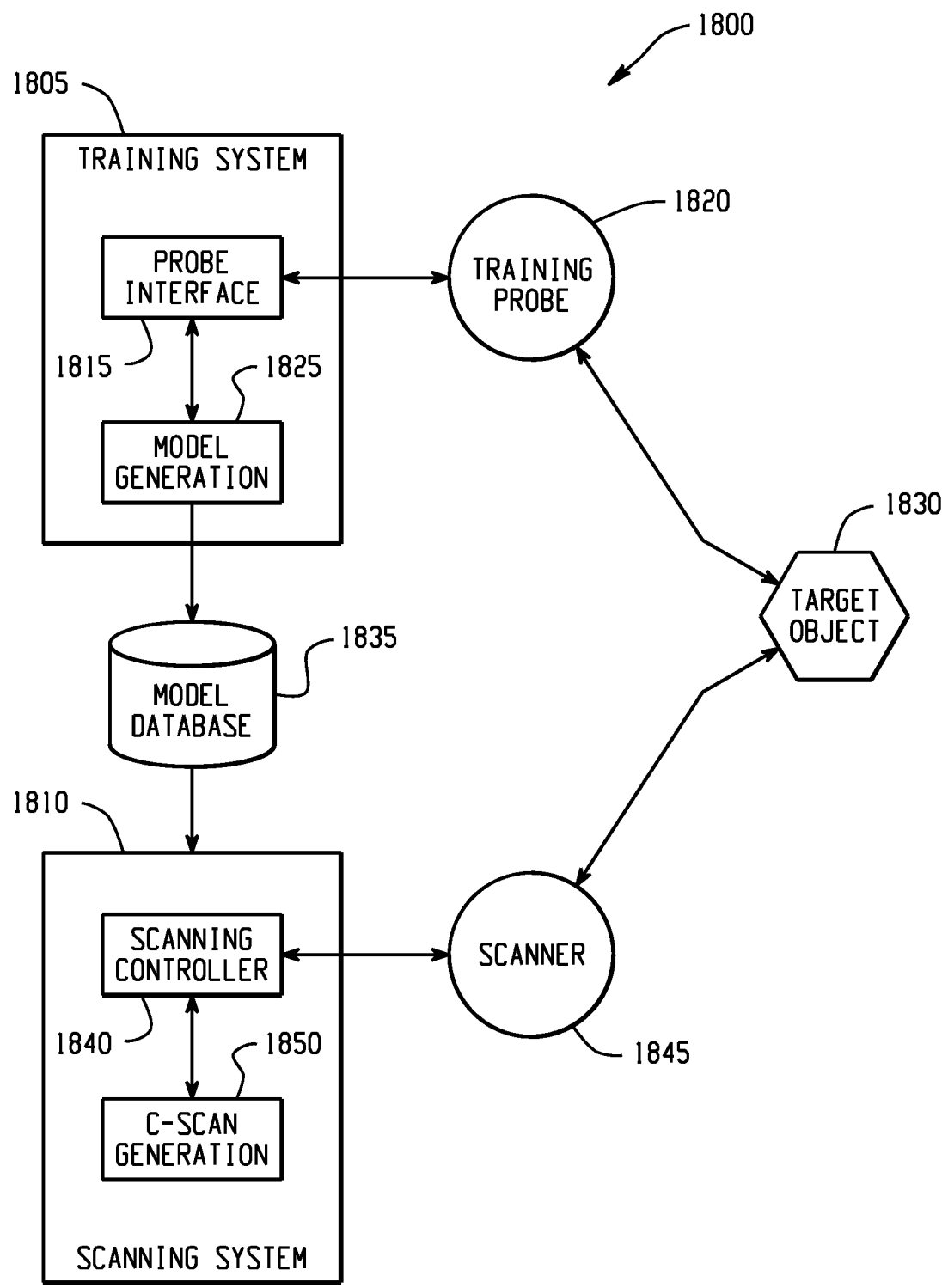
FIG. 18 is a diagram of an example system for generating a computer model of a three-dimensional object and using the computer model to collect measurement data in three-dimensional space and incorporate the measurement data into a plan view of the three-dimensional object.

FIG. 18 is a diagram of an example system 1800 for generating a computer model of a three-dimensional object and using the computer model to collect measurement data in three-dimensional space and incorporate the measurement data into a plan view of the three-dimensional object. The example system 1800 includes a training system 1805 and a scanning system 1810, which may each include one or more processors that execute software instructions stored on one or more computer-readable medium.

The training system 1805 includes a probe interface 1815 that is used to communicate with a training probe 1820 to collect training data for a target three-dimensional object 1830, and a model generation sub-system 1825 that is used to generate a computer model of the target object 1830. The training system 1805 is operable to generate a computer model of the three-dimensional object 1830 that correlates points on the three-dimensional object with points in three-dimensional space, and store the computer model in a model database 1835. The training system 1805 may, for example, include one or more processors that are configured to execute stored software instructions to perform the operations of the training phase 102 described above with reference to FIG. 1.

The scanning system 1810 includes a scanning controller 1840 that is used to communicate with a scanning probe 1845 to collect measurement data for the target object 1830, and a plan view image generation sub-system 1850 that is used to incorporate the collected measurement data into a plan view (e.g., C-Scan) image of the target object 1830. The scanning system 1810 is operable to use the stored computer model generated by the training system 1805 to collect measurement data of the three-dimensional object 1830 and associate the collected measurement data with points in three-dimensional space. The scanning system 1810 is further operable to generate a plan view computer model of the three-dimensional object 1845 that depicts the measurement data in two dimensions and that associates the depicted measurement data with points in three-dimensional space. The scanning system 1810 may, for example, include one or more processors that are configured to execute stored software instructions to perform the operations of the scanning phase 104 described above with reference to FIG. 1.

In embodiments, one or both of the training system 1805 and scanning system 1810 may be included in an AR enabled device, such as described above with reference to FIGS. 13-17. In embodiments, the example system 1800 may be used to inspect industrial equipment (e.g., pipes, tanks, vessels, etc.) by moving non-destructive testing (NDT) sensors along its surface, typically in order to measure the thickness of the material under the surface. Example sensors include ultrasonic transducers (UT), electro-magnetic acoustic transducer (EMAT), pulsed eddy current (PEC), magnetic flux leakage (MFL) and many others.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for collecting measurement data for a three-dimensional object, comprising:
    generating, by one or more processors, a computer model of the three-dimensional object that correlates points on the three-dimensional object with points in three-dimensional space, the computer model of the three-dimensional object generated by a training method comprising using position data for a plurality of training points on a surface of the three-dimensional object to generate a set of skeleton curves that connect the plurality of training points along the surface of the three-dimensional object;
    using the computer model to collect measurement data of the three-dimensional object and associate the collected measurement data with the points in three-dimensional space; and
    generating, by the one or more processor, a plan view computer model of the three-dimensional object that depicts the measurement data in two dimensions and that associates the depicted measurement data with the points in three-dimensional space.

2. The computer-implemented method of claim 1, wherein the computer model of the three-dimensional object is a two-dimensional texture model of the surface of the three-dimensional object.

3. The computer-implemented method of claim 1, wherein the training method further comprises:
    moving a sensor along the surface of the three-dimensional object to capture the position data and orientation data for the plurality of training points on the surface of the three-dimensional object, and
    using the set of skeleton curves to generate a parameterized surface model of the three-dimensional object.

4. The computer-implemented method of claim 3, further comprising:
    generating a raster scan pattern from the parameterized surface model,
    wherein the raster scan pattern is used to guide one or more measurement sensors along the surface of the three-dimensional object to collect measurement data of the three-dimensional object.

5. The computer-implemented method of claim 4, further comprising:
    displaying, by an augmented-reality enabled device, the raster scan pattern on an image of the three-dimensional object, and
    using the display of the raster scan pattern to guide the sensor along the surface of the three-dimensional object.

6. The computer-implemented method of claim 3, further comprising:
    generating the plan view computer model from the parameterized surface model of the three-dimensional object, wherein the plan view computer model includes a grid of cells spaced along the surface of the three-dimensional object.

7. The computer-implemented method of claim 6, wherein the collected measurement data is populated into the grid cells of the plan view computer model.

8. The computer-implemented method of claim 7, wherein the collected measurement data is ultrasonic measurement data, and the ultrasonic measurement data is populated into the grid cells of the plan view computer model to generate a C-Scan image.

9. The computer-implemented method of claim 7, wherein the plan view computer model associates the grid cells with positions in three-dimensional space.

10. A system for collecting measurement data for a three-dimensional object, comprising:
    one or more processors;
    training software instructions stored on one or more computer readable medium and executable by the one or more processors, the training software instructions when executed being configured to generate a computer model of the three-dimensional object that correlates points on the three-dimensional object with points in three-dimensional space, the computer model of the three-dimensional object generated by a training method comprising using position data for a plurality of training points on a surface of the three-dimensional object to generate a set of skeleton curves that connect the plurality of training points along the surface of the three-dimensional object; and
    scanning software instructions stored on the one or more computer readable medium and executable by the one or more processors, the scanning software instructions when executed being configured to,
        use the computer model to collect measurement data of the three-dimensional object and associate the collected measurement data with the points in three-dimensional space, and
        generate a plan view computer model of the three-dimensional object that depicts the measurement data in two dimensions and that associates the depicted measurement data with the points in three-dimensional space.

11. The system of claim 10, wherein the computer model of the three-dimensional object is a two-dimensional texture model of the surface of the three-dimensional object.

12. The system of claim 10, wherein the training software instructions are further configure to:
    cause a sensor to be moved along a surface of the three-dimensional object to capture the position data and orientation data for the plurality of training points on the surface of the three-dimensional object, and
    use the set of skeleton curves to generate a parameterized surface model of the three-dimensional object.

13. The system of claim 12, wherein the training software instructions are further configured to:
    generate a raster scan pattern from the parameterized surface model,
    wherein the raster scan pattern is used to guide one or more measurement sensors along the surface of the three-dimensional object to collect measurement data of the three-dimensional object.

14. The system of claim 13, further comprising:
    an augmented-reality enabled device configured to display the raster scan pattern on an image of the three-dimensional object,
    wherein the display of the raster scan pattern is for use in guiding the sensor along the surface of the three-dimensional object.

15. The system of claim 12, wherein the scanning software instructions are further configured to:
    generate the plan view computer model from the parameterized surface model of the three-dimensional object, wherein the plan view computer model includes a grid of cells spaced along the surface of the three-dimensional object.

16. The system of claim 15, wherein scanning software instructions are further configured to populate the collected measurement data into the grid cells of the plan view computer model.

17. The system of claim 16, wherein the collected measurement data is ultrasonic measurement data, and the ultrasonic measurement data is populated into the grid cells of the plan view computer model to generate a C-Scan image.

18. The system of claim 16, wherein the plan view computer model associates the grid cells with positions in three-dimensional space.

19. A non-transitory computer-readable storage medium comprising software instructions for which when executed cause a processing system to execute steps comprising:
   generating, by one or more processor, a computer model of the three-dimensional object that correlates points on the three-dimensional object with points in three-dimensional space, the computer model of the three-dimensional object generated by a training method comprising using position data for a plurality of training points on a surface of the three-dimensional object to generate a set of skeleton curves that connect the plurality of training points along the surface of the three-dimensional object;
   using the computer model to collect measurement data of the three-dimensional object and associate the collected measurement data with the points in three-dimensional space; and
   generating, by the one or more processor, a plan view computer model of the three-dimensional object that depicts the measurement data in two dimensions and that associates the depicted measurement data with the points in three-dimensional space.

20. The non-transitory computer readable medium of claim 19, wherein the computer model of the three-dimensional object is a two-dimensional texture model of the surface of the three-dimensional object.

* * * * *